(12) United States Patent
Park et al.

(10) Patent No.: US 12,137,424 B2
(45) Date of Patent: *Nov. 5, 2024

(54) DUAL CONNECTIVITY (DC) POWER CONTROL

(71) Applicant: T-MOBILE INNOVATIONS LLC, Overland Park, KS (US)

(72) Inventors: Justin Sungki Park, Ashburn, VA (US); Saied Kazeminejad, Ashburn, VA (US); Durga Prasad Satapathy, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/138,345

(22) Filed: Apr. 24, 2023

(65) Prior Publication Data

US 2023/0262617 A1 Aug. 17, 2023

Related U.S. Application Data

(63) Continuation of application No. 17/091,888, filed on Nov. 6, 2020, now Pat. No. 11,671,928, which is a continuation of application No. 16/134,858, filed on Sep. 18, 2018, now Pat. No. 10,873,915.

(51) Int. Cl.
*H04W 52/36* (2009.01)
*H04W 88/02* (2009.01)

(52) U.S. Cl.
CPC .......... *H04W 52/367* (2013.01); *H04W 88/02* (2013.01)

(58) Field of Classification Search
CPC . H04W 52/367; H04W 88/02; H04W 52/241; H04W 52/245; H04W 52/146; H04W 52/24; H04W 52/365
See application file for complete search history.

(56) References Cited

U.S. PATENT DOCUMENTS

| | | | |
|---|---|---|---|
| 2011/0039569 A1* | 2/2011 | Narasimha | H04W 52/244 455/452.2 |
| 2015/0271761 A1* | 9/2015 | Park | H04W 76/16 370/329 |
| 2019/0223077 A1* | 7/2019 | Kwok | H04M 11/06 |
| 2019/0253988 A1* | 8/2019 | Khoshnevisan | H04L 1/1812 |
| 2020/0128494 A1* | 4/2020 | Lu | H04W 52/367 |

* cited by examiner

*Primary Examiner* — Ankur Jain
(74) *Attorney, Agent, or Firm* — Shook, Hardy & Bacon, L.L.P.

(57) ABSTRACT

Systems and methods are provided for dynamic power allocation of a first maximum uplink power and a second maximum uplink power, wherein the first maximum uplink power is used by a first transmitter to communicate with a first access point and the second maximum uplink power is used by a second transmitter to communicate with a second access point (dual connectivity). Network parameters are determined based on characteristics and/or qualities of the downlink and/or uplink signals of a wireless communication session. In response to the determined network parameters, the WCD may increase a first maximum uplink power and decrease a second maximum uplink power in order to establish or maintain dual connectivity without exceeding the device's maximum total uplink power.

18 Claims, 8 Drawing Sheets

DUAL CONNECTIVITY (DC) POWER CONTROL

CROSS-REFERENCE TO RELATED APPLICATIONS

This application is a continuation of U.S. patent application Ser. No. 17/091,888, filed on Nov. 6, 2020, entitled "DUAL CONNECTIVITY (DC) POWER CONTROL," which is a continuation of U.S. patent application Ser. No. 16/134,858, filed on Sep. 18, 2018, entitled "DUAL CONNECTIVITY (DC) POWER CONTROL" (now U.S. Pat. No. 10,873,915), the entireties of which are incorporated herein by reference.

OVERVIEW

The present disclosure is directed, in part, to dual connectivity power control, substantially as shown in and/or described in connection with at least one of the figures, and as set forth more completely in the claims.

In aspects set forth herein, a maximum uplink power for each of two transmitters in a user equipment (UE) is dynamically adjusted in order to improve the ability of the UE to have dual connectivity with a wireless telecommunications network. While typically, a maximum uplink power is hard-set into a phone and is not capable of dynamic modification, aspects herein enable one maximum uplink power to be greater than the other, based on any one or more network indicators. A conventional power transmit scheme, therefore, may not be able to effectively communicate with a first access point despite having significantly excess power head room based on communications with a second access point. For example, if a UE has a maximum total uplink power of 26 dBm, conventionally, the maximum uplink power of each transmitter may be set at 23 dBm (half the output wattage of 26 dBm). If the UE only needs 19 dBm to communicate with the second access point, this theoretically leaves approximately 25 dBm of total power headroom. If the UE requires 25 dBm to communicate with the first access point, it will not be able to establish a connection because each transmitter's maximum uplink power is capped at 23 dBm, despite having 25 dBm of total power headroom.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
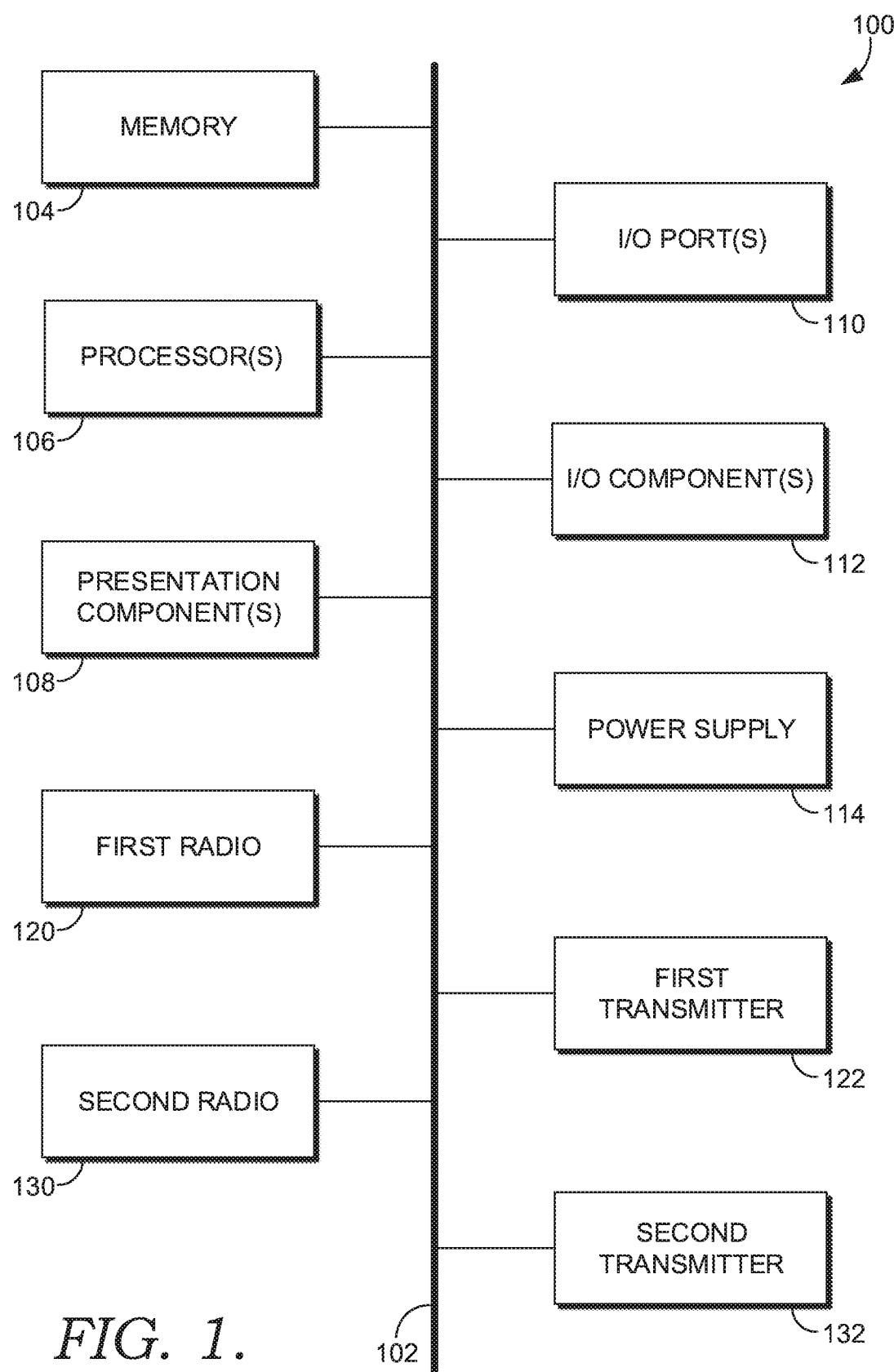
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a UE according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

Generally speaking, many modern UE comprise at least two transmitters; in some configurations, a UE may operate using dual connectivity. That is, the UE may use at least a first of its transmitters to communicate an uplink signal to a first access point and at least a second of its transmitters to communicate an uplink signal to a second access point. In other configurations, a UE may operate using single connectivity, wherein it uses one or more of its transmitters to communicate with a single access point, base station, or cell site. Whether using dual connectivity or single connectivity, a UE may have a pre-set maximum total uplink power (as will be discussed in greater detail below). Conventionally, a communication session between a UE and an access point comprises an uplink handshake, wherein the uplink handshake is an uplink signal from the UE to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, however, is not true; if the uplink handshake fails at the maximum pre-set uplink power, the UE may not increase the power of the transmission (it may retry again later or attempt to connect to a different access point, for example).

Further, as communication protocols rapidly evolve from 3G, to 4G/LTE, to 5G, it is conceived that a UE may benefit from connecting to more than one access point using more than one protocol. For example, a 5G communication session may have a higher throughput, used for a data session, and a 4G communication session may have characteristics that make it more suitable for a voice session. Thus, it may be desirable for the UE to be simultaneously connected to more than one access point using more than one protocol.

The present disclosure is directed to systems, methods, and computer readable media that are an improvement over conventional communications between a UE and an access point. In accordance with aspects described herein, network parameters for a wireless communication session between a UE and each of a first access point and second access point can be collected and/or analyzed to dynamically determine how the device's maximum total uplink power should be allocated between the UE's first maximum uplink power, used by the first transmitter, and the second maximum uplink power, used by the second transmitter.

Being able to dynamically modify each of the first and second maximum uplink power, without the limitations of pre-configured native maximums may enable the UE to communicate with an access point that may have previously been out of reach. Further, dual connectivity may permit the UE to realize the full benefit of diverse protocols and wireless service features, such as the dependability of 4G and high-bandwidth of 5G (or to use the benefits of any other combination of two protocols). Further, by realizing dual connectivity, the network may be able to better balance UEs between cell locations, expediting communication sessions, and consequently reducing network loads. From a UE perspective, a device may be able to simultaneously communicate with two access points, increasing throughput.

As employed herein, user equipment (UE) (also referenced herein as a user device or wireless communications device (WCD)) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

As used herein, user devices that are spatially distributed with respect to a first and second access point may be said to be in different locations relative to one or more access points. That is, a first device's location may be described herein as being further from a first access point, relative to a second device. Such distance-related terminology may be read to mean a distance at ground level between the ground level of the access point and the ground level of the device, it may refer to the distance actually traveled by the signal (in aspects, affected by multipath, reflection, etc), and/or it may refer to a signal strength (e.g., a first device is further from an access point than a second device based on the downlink signal received at the first device being weaker than the downlink signal received at the second device).

Accordingly, a first aspect of the present disclosure is directed to a system for dynamically allocating maximum uplink power in a WCD, the system comprising: a first access point, the first access point configured to transmit a first wireless downlink signal to the WCD; a second access point, the second access point configured to transmit a second wireless downlink signal to the WCD; and a processor, the processor configured to perform operations comprising: determining at least one network parameter for a wireless communication session between the WCD and each of the first access point and the second access point; and in response to the determined at least one network parameter, instruct the WCD to dynamically modify each of a first maximum uplink power and a second maximum uplink power, wherein the first maximum uplink power is used by a first transmitter of the WCD to transmit a first wireless uplink signal to the first access point and the second maximum uplink power is used by a second transmitter of the WD to transmit a second wireless uplink signal to the second access point.

A second aspect of the present disclosure is directed to a method for dynamic power allocation in a wireless communications device. The method includes receiving an indication that a first wireless downlink signal has been received by the WCD from a first access point, receiving an indication that a second wireless downlink signal has been received by the WCD from a second access point, determining at least one network parameter for a wireless communication session between the WCD and each of the first access point and the second access point, and instructing the WCD to dynamically modify, in response to the determined at least one network parameter, each of a first maximum uplink power and second maximum uplink power, the first maximum uplink power being the maximum available power to be transmitted by a first transmitter of the WCD and the second maximum uplink power being the maximum available power to be transmitted by a second transmitter of the WCD.

Another aspect of the present disclosure is directed to anon-transitory computer storage media storing computer-useable instructions that, when used by one or more processors cause the processors to receive an indication that a first wireless downlink signal has been received by the WCD from a first access point, receive an indication that a second wireless downlink signal has been received by the WCD from a second access point, determine at least one network parameter for a wireless communication session between the WCD and each of the first access point and the second access point, and instruct the WCD to dynamically modify, in response to the determined at least one network parameter, each of a first maximum uplink power and second maximum uplink power, the first maximum uplink power being the maximum available power to be transmitted by a first transmitter of the WCD and the second maximum uplink power being the maximum available power to be transmitted by a second transmitter of the WCD.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with a wireless telecommunications network. In aspects, the first radio 120 utilizes a first transmitter 122 to communicate with the wireless telecommunications network and the second radio 130 utilizes the second transmitter 132 to communicate with the wireless telecommunications network. Though two radios are shown, it is expressly conceived that a computing device with a single radio (i.e., the first radio 120 or the second radio 130) could facilitate communication with the wireless telecommunications network via both the first transmitter 122 and the second transmitter 132. Illustrative wireless telecommunications technologies include CDMA, GPRS, TDMA, GSM, and the like. One or both of the first radio 120 and the second radio 130 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
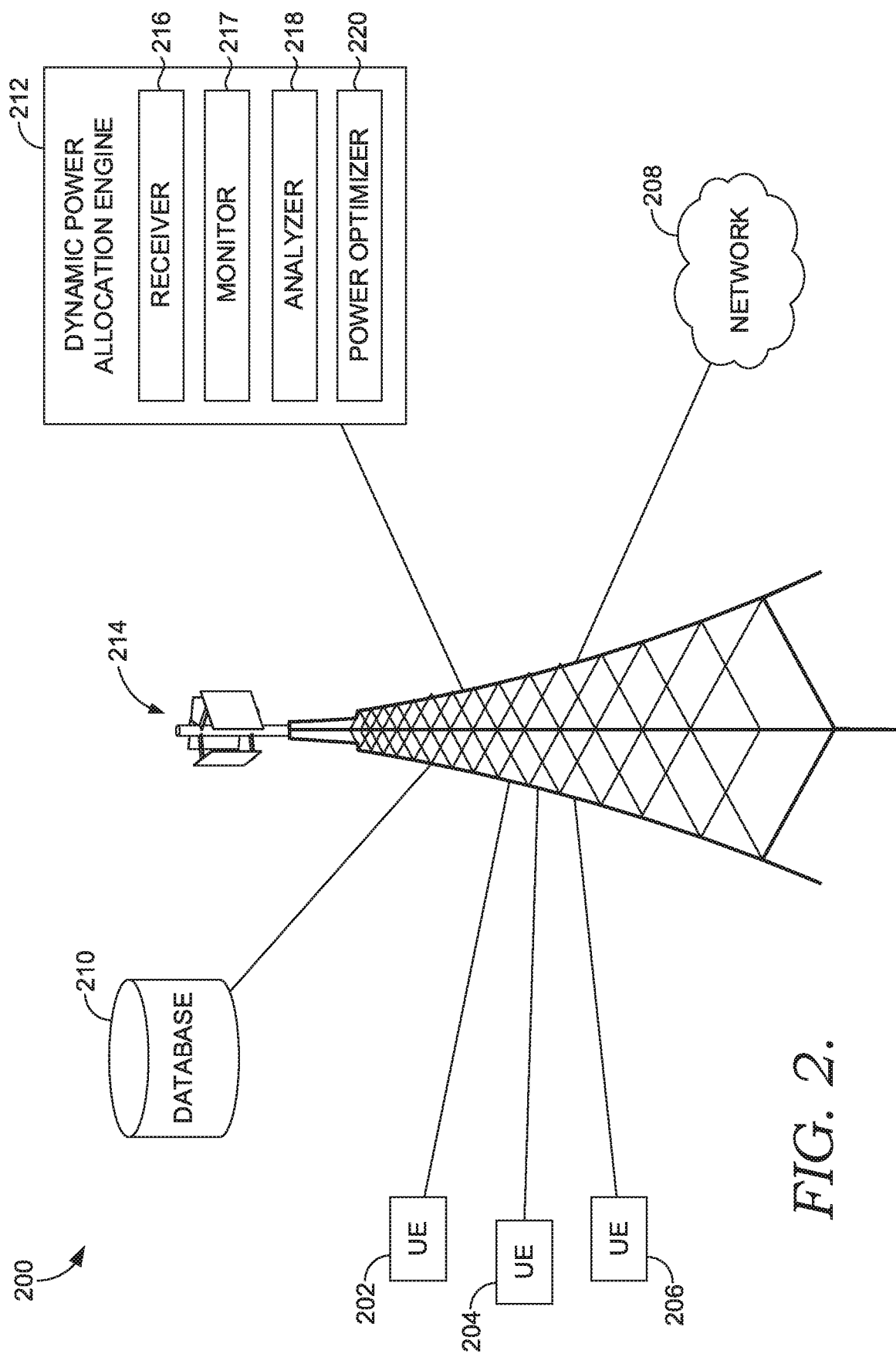
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), access point 214 (which may be a cell site, base station, or the like), network 208, database 210, and dynamic power allocation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with user devices, such as user devices 202, 204, and 206 that are located within the geographical area, or cell, covered by radio antennas of cell site 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming. When a cell has users with user devices spatially separated from one another (e.g., high rise buildings, offices during the workday) at one time and spatially grouped together (e.g., nightclub, convention) at another time, traditional beamforming may not be able to capture most or all of the user devices at one time or another (or both) as adjusting a beamform only horizontally or only adjusting gain would not allow the beam to dynamically and simultaneously change in the x, y, and z planes (at least some change in each plane being consistent with the term 3D beamforming as used herein).

As shown, access point 214 is in communication with dynamic power allocation engine 212, which comprises various components that are utilized, in various implementations, to perform one or more methods for dynamically adjusting 3D beamforms emitted from an antenna array in one or more wireless communications networks. In some implementations, dynamic power allocation engine 212 comprises components including a receiver 216, a monitor 217, an analyzer 218, and a power optimizer 220. However, in other implementations, more or less components than those shown in FIG. 2 may be utilized to carry out aspects of the invention described herein.

The receiver 216 of the dynamic beamforming engine 212 is generally responsible for receiving information from various user devices, such as user devices 202, 204, and 206, which are within the coverage area of access point 214. Information sent from a user device to the access point 214 may comprise location information of the user device and network parameters determined at or by the user device that includes information on how good or bad the communication channel quality is (SINR, pathloss, or the like) and the device power levels (maximum uplink powers and maximum total uplink power). Location information may be based on GPS or other satellite location services, terrestrial triangulation, an access point location, or any other means of obtaining coarse or fine location information. Network parameters may indicate a realized uplink and/or downlink transmission data rate, observed signal-to-interference-plus-noise ratio (SINR) and/or signal strength at the user device, pathloss, or throughput of the connection. Location and/or network parameters may take into account the user device capability, such as the number of antennas and the type of receiver used for detection.

The monitor 217 is generally responsible for determining network parameters and a plurality of uplink footprints emitted by each of the user devices 202, 204, and 206. As mentioned, some network parameters may be determined by the user device and passed to the receiver 216, other network parameters may be determined by the monitor 217. The monitor 217 may make said determinations based on a user device's default maximum uplink power. In other aspects, the monitor 217 may make said determinations based on the most recent maximum uplink power. Whichever power levels are used, the monitor 217 may use it as a baseline for determining and instructing adjustments. As used herein, the term uplink footprint may be considered to be synonymous with a radiation pattern of a user device, such as user device 202, 204, and 206 at a particular time. The uplink footprint may generally refer to the area in space in which the user device 202, 204, and 206 emits a transitory signal having enough signal strength (dBm) to be effectively received and processed by an access point, such as access point 214, to sustain a wireless communication session. In aspects, the monitor 217 may determine a first uplink footprint for a first transmitter of the user device 202, 204, and 206 and determine a second uplink footprint for a second transmitter of the user device 202, 204, and 206.

The analyzer 218 is generally responsible for combining location and any network parameter information received by the receiver 216, and comparing it to the plurality of uplink footprints and any network parameters as determined by the monitor 217. The analyzer 218 may consider whether access point 214 is within one of the plurality of uplink footprints of the user device. The analyzer 218 may also consider the quality of an uplink signal from the user device to determine if one of the first maximum uplink power and the second maximum uplink power should be increased to establish, maintain, and/or improve a wireless communication session with the access point 214. As will be discussed herein, the analyzer may compare the location of the user devices with respect to the access point, the pathloss and the SINR of the downlink and/or uplink signals (among other network parameters) with the plurality of uplink footprints. In aspects, when multiple network parameters and/or location information is received from the same user device, the analyzer may use an average, mean, median or any other statistical analysis to determine a single network parameter and/or location of a particular user device.

The power optimizer 220 is generally responsible for determining how one or more of the plurality of uplink footprints of a user device should be adjusted and instructing the device to execute the adjustment. The power optimizer 220 may determine, based on the analysis performed by the analyzer 218, that the a first of the plurality of uplink footprints is excessive to communicate with a first access point and a second of the plurality of uplink footprints is inadequate to communicate with a second access point. The power optimizer 220 may thus instruct the relevant user device to reduce the maximum uplink power associated with transmitting the first of the plurality of uplink footprints and increase the maximum uplink power associated with transmitting the second of the plurality of uplink footprints. Alternatively or additionally, the power optimizer 220 may determine, based on the analysis performed by the analyzer 218 a first maximum uplink power needed to effectively communicate with a first access point a second maximum uplink power needed to effectively communicate with a second access point and instruct the user device to execute the adjustment(s) necessary to effect the first and second maximum uplink powers (without regard to a pre-existing plurality of uplink footprints).

Figure 3A:
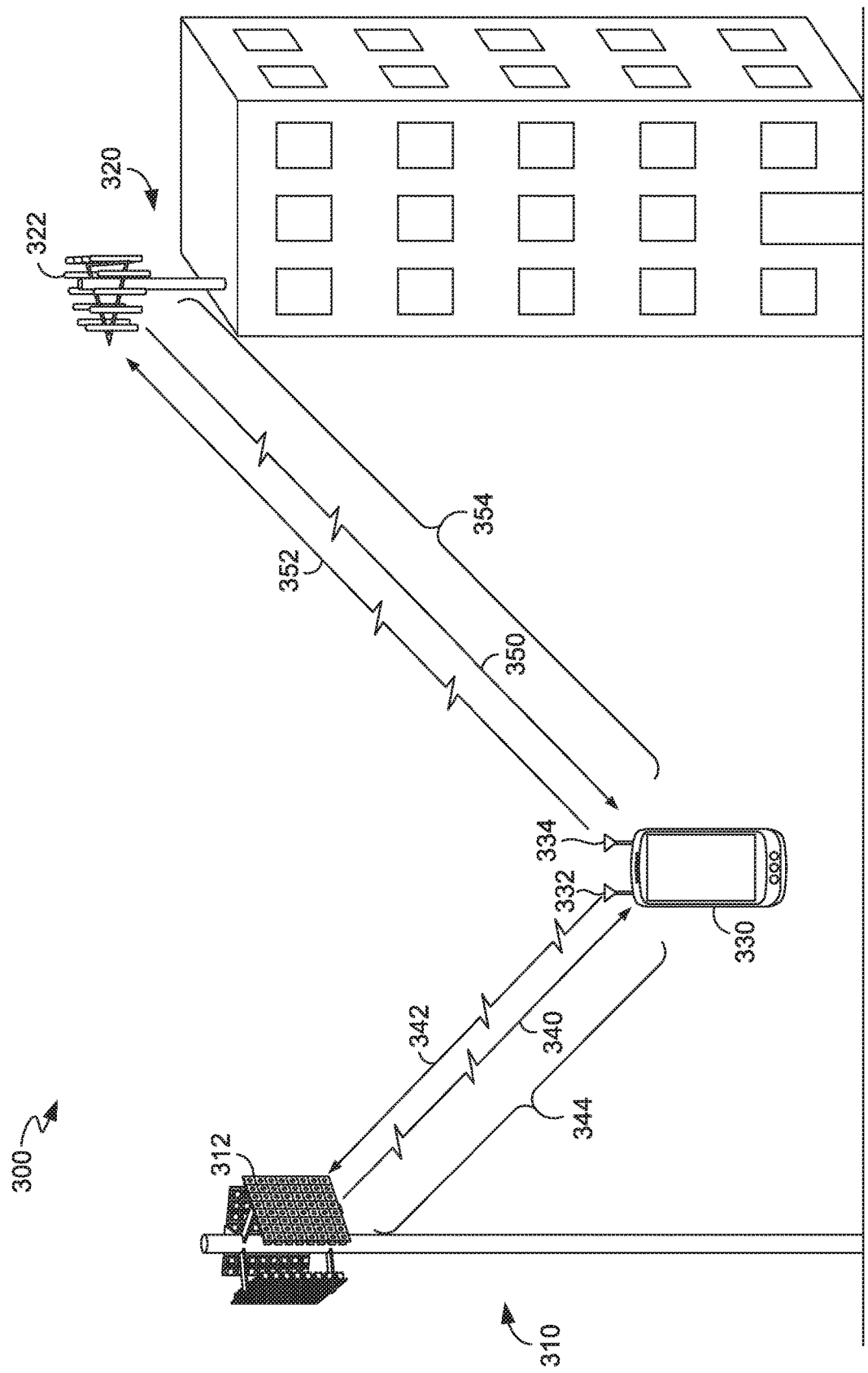
FIGS. 3A-3B each depict a representation of a first and second access point wirelessly communicating with a UE in accordance with aspects herein.
Figure 3B:
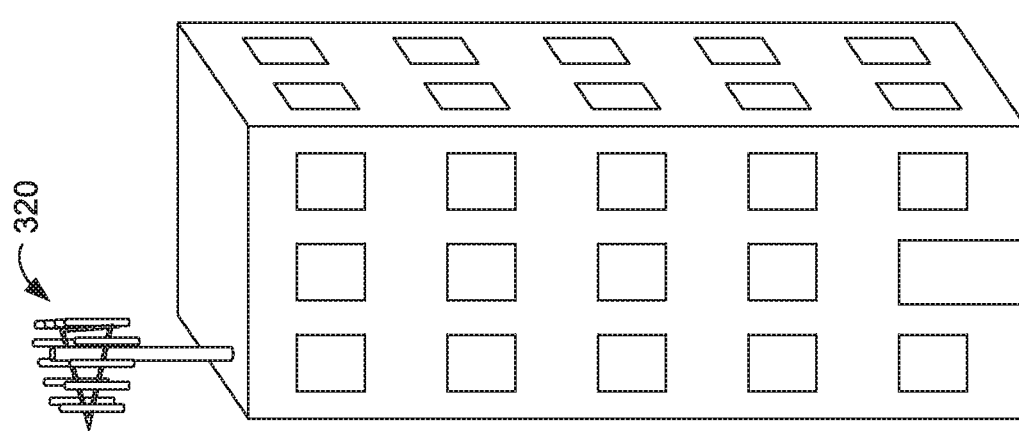
Figure 3B:
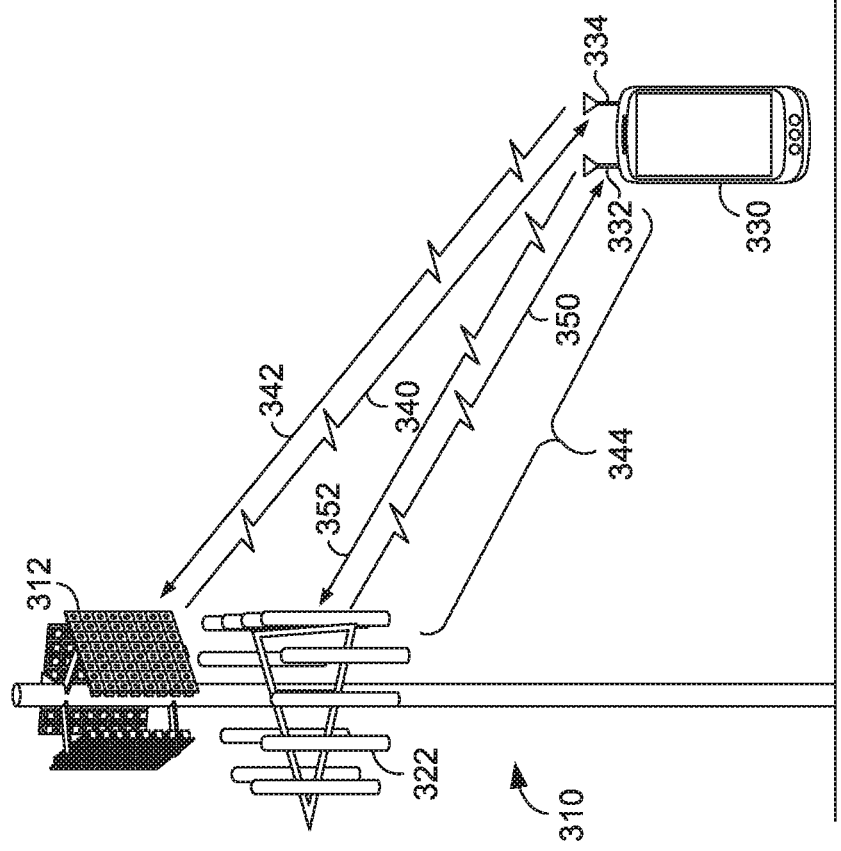

Turning now to FIGS. 3A-3B, a representation of a system 300 comprises a first access point 312 and a second access point 322 wirelessly communicating with a UE 330 in accordance with aspects herein. The first access point 312, the second access point 322, and the UE 330 are but one example of suitable configurations and are not intended to suggest any limitations as to the scope of use or functionality of embodiments described herein. Neither should the configuration be interpreted as having any dependency or requirement relating to any one or combination of components illustrated.

In some aspects, the first access point 312 comprises a 5G or MIMO access point, and the second access point 322 comprises a 4G or eNodeB access point. That is, the first access point 312 may wirelessly communicate with the UE 330 via a 5G wireless communication protocol, and the second access point 322 may wirelessly communicate with the UE 330 via a 4G wireless communication protocol. In other aspects, the first access point 312 may be any of a first type of access point configured to wirelessly communicate with the UE 330 via a first wireless communication protocol, and the second access point 322 may be any of a second type of access point configured to wirelessly communicate with the UE 330 via a second wireless communication protocol. For example, the first access point 312 may be an eNodeB, capable of wirelessly communicating with the UE 330 via 4G or LTE communication protocols. The second access point 322 may be a nodeB, capable of wirelessly communicating with the UA 330 via 3G. Any combination thereof is expressly conceived and the present disclosure is not limited to any one or more particular types of access points nor any one or more particular types of wireless communication protocols.

The first access point 312 may be said to be located on or near a first base station 310 at a first site. The second access point 322 may be said to be located on or near a second base station 320 at a second site. Alternatively, as seen in FIG. 3b, the first access point 312 and the second access point 322 may be disposed at or near the first base station 310, and may be co-located at the same site. Returning to FIG. 3a, and strictly for illustrative purposes, the first access point 312 is shown on a tower and the second access point 322 is shown atop a structure; however, the first access point 312 and/or the second access point 322 may be disposed in a variety of manners, including but not limited to, on a tower, on a structure, disposed on a mobile asset (e.g., a vehicle), in the window of a building, or the like. Further, despite the first access point 312 and the second axis 322 being shown as macro cells, the first access point 312 and/or the second access point 322 may be a macro cell, micro cell, femto cell, small cell, router, repeater, or any other nexus between the wireless communication device and the wireless network.

Seen in FIGS. 3a and 3b, the first access point 312 may communicate a first wireless downlink signal 340 to the UE 330, and a first transmitter 332 of the UE 330 may communicate a first wireless uplink signal 342 to the first access point 312. The second access point 322 may communicate a second wireless downlink signal 350 to the UE 330, and a second transmitter 334 of the UE 330 may communicate a second wireless uplink signal 352 to the second access point 322. Any one or more of the first access point 312 and the second access point 322 may comprise and/or be coupled to (including communicatively coupled to) a processor, such as a server, database, computer, a combination of components such as the dynamic power allocation engine 212, a radio, a controller, or the like. In aspects, the processor may be configured to perform operations comprising determining at least one network perimeter for a wireless communication session between the UE 330 and each of the first access point 312 and the second access point 322. In response to such a determination, the processor may instruct the UE 330 to dynamically modify each of the first maximum uplink power and a second maximum uplink power, wherein the first maximum uplink power is used by the first transmitter 332 to transmit the first wireless uplink signal 342 to the first access point 312 and a second maximum uplink power is used by the second transmitter 334 to transmit a second wireless uplink signal 352 to the second access point 322.

As seen in FIG. 3a, in instances where the first access point 312 and the second access point 322 are not co-located, it can be said that both the first wireless downlink signal 340 and the first wireless uplink signal 342 travel a first distance 344 between the first access point 312 and the UE 330. It can be said that both the second wireless downlink signal 350 and the second wireless uplink signal 352 travel a second distance 354 between the second access point 322 and the UA 330. As seen in FIG. 3b, in instances where the first access point 312 and the second access point 322 are co-located, it can be said that all of the first wireless downlink signal 340, the first wireless uplink signal 342, the second wireless downlink signal 350, and the second wireless uplink signal 352 travel the first distance 344.

Figure 4:
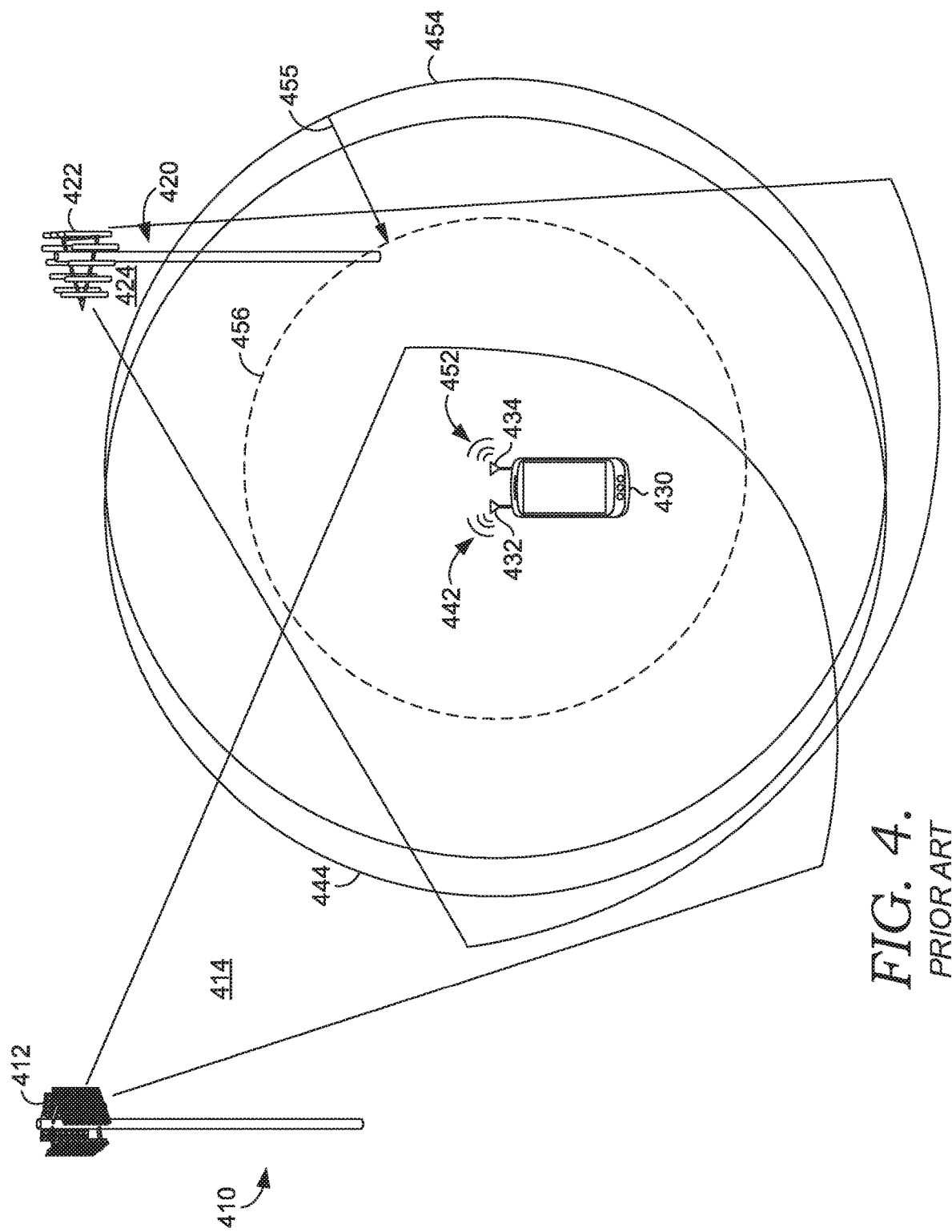
FIG. 4 illustrates how conventional beamforms of a first and second access points and UE affect the ability of the UE to wirelessly communicate with the first and second access points.

FIG. 4 illustrates a shortcoming of conventional uplink power control. A first access point 412 located at a first base station 410 transmits a first wireless downlink signal having a first wireless downlink footprint 414. A second access point 422 located at a second base station 420 transmits a second wireless downlink signal having a second wireless downlink footprint 424. For the purposes of FIG. 4, a UE 430 is within the first wireless downlink footprint 414 and the second wireless downlink footprint 424. The UE 430 comprises a first transmitter 432 transmitting a first wireless uplink signal 442 and a second transmitter 434 transmitting a second wireless uplink signal 452. The UE 430 may have, for instance, a maximum total uplink power of 27 dBm. Conventionally, this maximum total uplink power is divided in half, meaning that the first transmitter 432 has a first maximum uplink power of 24 dBm and the second transmitter 434 has a second maximum uplink power of 24 dBm. At or near the beginning of a wireless communication session the UE 430 may perform an uplink handshake with each of the first access point 412 and second access point 422. During such a procedure, the first transmitter 432 transmits the first wireless uplink signal 442 at the first maximum uplink power of 24 dBm. This results in a first uplink footprint 444. As seen in FIG. 4, the first uplink footprint 444 does not capture the first access point 412; this means that even though the first wireless downlink signal from the first access point 412 can reach the UE 430, the first access point 412 and the UE 430 cannot have a wireless communication session because the first wireless uplink signal from the UE 430 cannot reach the first access point 412. The second transmitter 434 transmits the second wireless uplink signal 452 at the second maximum uplink power of 24 dBm, resulting in a second uplink footprint 454. As illustrated in FIG. 4, the second uplink footprint captures the second access point 422. Conventional power allocation may determine that excess uplink power is being used by the second transmitter 434 to transmit the second wireless uplink signal 452 and the UE may be instructed (or instruct itself) to reduce the uplink power, resulting in the second uplink footprint 454 being reduced by a distance 455 to an adjusted second uplink footprint 456. The adjusted second uplink footprint 456 continues to capture the second access point 422, but by using less power. However, because the first maximum uplink power cannot exceed 24 dBm, the UE 430 has no way to adjust to communicate with the first access point 412.

Figure 5:
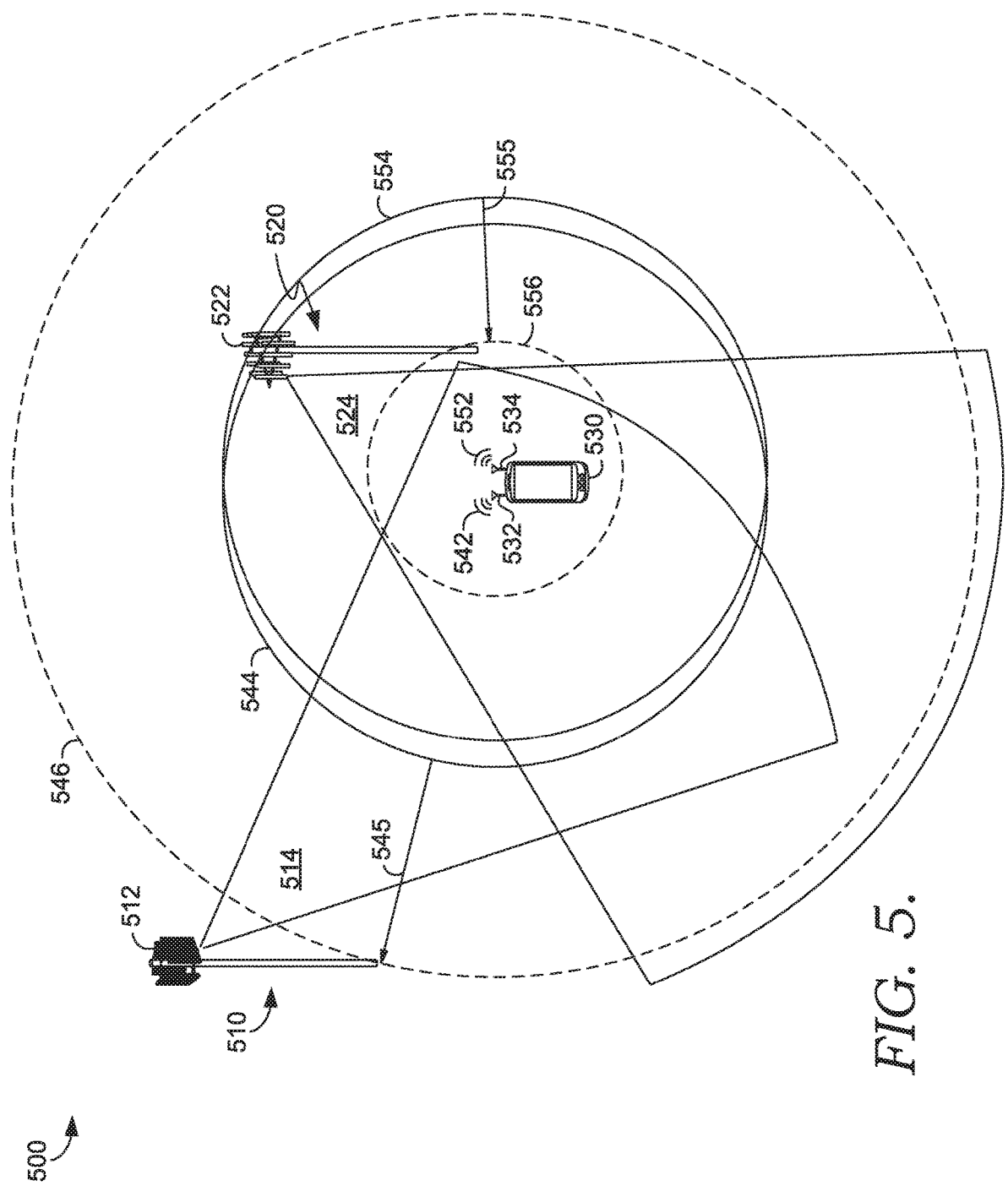
FIG. 5 illustrates how the beamforms of a first and second access point and UE may be impacted by dual connectivity power control to improve and/or create wireless connections to a network in accordance with aspects herein.

Turning now to FIG. 5, the impact of a system for dynamically allocating the maximum total uplink power of a UE 530 is illustrated in accordance with aspects herein. A first access point 512 at a first base station 510 transmits a first wireless downlink signal having a first wireless downlink footprint 514. A second access point 522 located at a second base station 520 transmits a second wireless downlink signal having a second wireless downlink footprint 524. The first wireless downlink signal is communicated to the UE 530 using a first protocol and the second wireless downlink signal is communicated to the UE 530 using a second protocol. In aspects, each of the first protocol and the second protocol may be any protocol as long they are not the same protocol (e.g., the first protocol is 5G and the second protocol is 4G). In other aspects, the first wireless downlink signal and the second wireless downlink signal may use the same protocol (e.g., both 5G), but may use different frequency bands (e.g., the first wireless downlink signal uses 5G on an n41 band, and the second wireless downlink signal uses 5G on a millimeter wave band).

As seen in FIG. 5, the UE 530 is within the first wireless downlink footprint 514 and the second wireless downlink footprint 524, meaning the UE 530 is capable of receiving and/or usefully processing a downlink signal from both access points. The UE 530 comprise a first transmitter 532 transmitting a first wireless uplink signal 542 and a second transmitter 534 transmitting a second wireless uplink signal 552. Like the UE 430 of FIG. 4, the UE 530 of FIG. 5 may have a maximum total uplink power. The maximum total uplink power may be set by a device maker, carrier, regulatory body, or any other entity. Limits on maximum total uplink power are necessary to avoid excessive noise created by UEs on the wireless network, for example. As such, the maximum total uplink power may be fixed, semi-fixed, controlled by hardware, firmware, or software, but in any case, for the present disclosure, it is assumed that the maximum total uplink power may not be increased during any particular wireless communication session. In aspects, the maximum total uplink power may be 23, 26, 27, 29, or 30 dBm, or may be any power between 10 and 35 dBm.

For the purposes of highlighting a difference from conventional power allocation, the first base station 412, second base station 422, and UE 430 of FIG. 4 may be said to be in the same position, relative to each other, as the first base station 512, second base station 522, and UE 530 of FIG. 5. At or near the beginning of a wireless communication session between the UE 530 and each of the first access point 512 and the second access point 522, the UE 530 may perform an uplink handshake with each of the first access point 512 and second access point 522. During such a procedure, the first transmitter 532 transmits the first wireless uplink signal 542 at a first maximum uplink power resulting in a first uplink footprint 544, and the second transmitter 534 transmits a second wireless uplink signal 552 resulting in a second uplink footprint 554.

In a first aspect, dynamic allocation of the UE 530's maximum total uplink power may occur after an attempted uplink handshake. An initial uplink handshake may take place or be attempted between the first transmitter 532 and the first access point 512 using an initial first maximum uplink power, and between the second transmitter 534 and the second access point 522 using an initial second maximum uplink power. The initial first and second maximum uplink power may be the most recently used maximum uplink powers (e.g., during the most recent communication session, the first maximum uplink power was 20 dBm and the second maximum uplink power was 26 dBm), an even portion of the maximum total uplink power (e.g., each of the first and second maximum uplink powers are 24 dBm), or based on historical or other known information about the UE and/or the first and second access points (e.g., based on the UE's geographic location, if it is known that access points using the protocol of the first access point 512 are more sparsely situated than access points using the protocol of the second access point 522, the first maximum uplink power may be set to 25 dBm and the second maximum uplink power may be set to 22.7 dBm).

Using the initial first maximum uplink power, the first uplink footprint 544 does not capture the first access point 512; this means that even though the first wireless downlink signal from the first access point 512 can reach the UE 530, the first access point 512 and the UE 530 cannot have a wireless communication session because the first wireless uplink signal from the UE 530 cannot reach the first access point 512. This failure could be based on any one or more network parameters, wherein a network parameter comprises pathloss, SINR, multipathing, atmospheric ducting, distance between the UE and an access point, height of eye of the UE, line of sight between the UE and an access point, or any other atmospheric, electrical, electromagnetic, or mechanical effect or phenomenon. Using the initial second maximum uplink power, the first uplink footprint 554 captures and exceeds the requirement to communicate the second uplink signal to the second access point 522 based on any one or more network parameters. At least for the purposes of this disclosure, the amount of the second maximum uplink power that causes the second uplink footprint to exceed what is required to establish and/or maintain a wireless communication session with the second access point 522 will be referred to as the power headroom.

Accordingly, it may be determined, based on one or more network parameters, that the first transmitter 532 of the UE 530 has attempted and failed to establish and/or maintain an uplink connection to the first access point 512 and that the second transmitter 534 has established and/or maintained an uplink connection to the second access point 522 with power headroom. Such a determination may be made at/by the UE, at/by either or both of the first access point 512 and the second access point 522, a processor such as a network controller, or any other device, engine, or component communicatively coupled to the wireless communication network and capable of determining the one or more network parameters. Based on said determination, the UE 530 may (if determined locally) adjust, or be instructed to adjust (if determined remotely, relative to the UE), one or more of the first and second maximum uplink powers. Such an adjustment may be the result of an inverse relationship between the first maximum uplink power and the second maximum uplink power, that is, as the second maximum uplink power is reduced, the first maximum uplink power may be proportionately increased. Once the first maximum uplink power is increased, an uplink handshake may be re-attempted. If the uplink handshake is successful between the first transmitter 532 and the first access point 512, it is possible that the first maximum uplink power has power headroom, in which case the UE 530 may transmit the first uplink signal 542 at an uplink power less than the first maximum uplink power.

A hypothetical example of the aforementioned aspect is best explained in the context of FIG. 5. For the purpose of this hypothetical, the UE 530 has a maximum total uplink power of 27 dBm and the initial first and second maximum uplink powers are based on dividing the maximum uplink power (each of the initial first and second maximum uplink powers are half of 27 dBm, or 24 dBm each). The first transmitter 532 transmits the first uplink signal 542 according to a first protocol (e.g., 4G) at the initial first maximum uplink power of 24 dBm, resulting in the first uplink footprint 544. The second transmitter 534 transmits the second uplink signal 551 according to a second protocol (e.g., 5G) at the initial second maximum uplink power of 24 dBm, resulting in the second uplink footprint 554. A processor communicatively coupled to the second access point determines that a first network parameter (high pathloss) has resulted in a failed uplink handshake between the first transmitter 532 and the first access point 512 (seen as the first access point 512 being outside the first uplink footprint 544). The same processor may also determine that a second network parameter (lower pathloss) has resulted in a successful uplink handshake between the second transmitter 534 and the second access point 522 (seen as the second access point 522 being well within the second uplink footprint 554) with a power headroom of 4 dBm. Based on these determined network parameters, the processor instructs the UE 530 to reduce the second maximum uplink power by 4 dBm, to 20 dBm, and to proportionately increase the first maximum uplink power by 2 dBm, to 26 dBm. Just as prior to this dynamic allocation, the sum of the first and second maximum uplink powers equal the maximum total uplink power of 27 dBm. By increasing the first maximum uplink power, the first transmitter 532 may increase the first uplink footprint by a distance 545 to yield a modified first uplink footprint 546, encompassing the first access point 512. By decreasing the second maximum uplink power, the second transmitter 534 may decrease the second uplink footprint by a distance 555 to yield a modified second uplink footprint 556. As the first access point 512 is within the modified first uplink footprint 545 and the second access point 522 is within the modified second uplink footprint 556, the UE 530 is able to establish and/or maintain dual connectivity with both access points.

In another aspect, dynamic allocation of the UE's maximum total uplink power may occur prior to one or more actual or attempted uplink handshakes. That is, the maximum total uplink power of the UE 530 may be dynamically allocated prior to one or more of the first transmitter 532 establishing or attempting an uplink connection with the first access point 512 and the second transmitter 534 establishing or attempting an uplink connection with the second access point 522. In such an aspect, the UE 530 may receive a first wireless downlink signal from the first access point 512 and receive a second wireless downlink signal from the second access point 522. In aspects, one or more network parameters based on the first and/or second wireless downlink signals may be determined. Such a network parameter may comprise pathloss, SINR, multipathing, atmospheric ducting, distance between the UE and an access point, height of eye of the UE, line of sight between the UE and an access point, or any other atmospheric, electrical, electromagnetic, or mechanical effect or phenomenon. As can be appreciated, one or more network parameters may be determined prior to any actual or attempted uplink handshake.

Based on the one or more determined network parameters, it may be determined that an uplink handshake would fail if attempted at an initial maximum uplink power. Such a determination may be made by the UE 530, by one or more of the first access point 512 and the second access point 522, by any other processor such as a network controller, or by any other device, engine, or component communicatively coupled to the wireless communication network and capable of determining the one or more network parameters. In some aspects, it may become necessary for the UE 530 to communicate to the wireless communication network, via at least one of the first access point 512 and the second access point 522, that the UE 530 has received the first and second wireless downlink signals. In some aspects, this may be accomplished by the UE 530 transmitting a sounding reference signal, or by carrying out an uplink handshake with one of the first access point 512 and the second access point 522. For example, the UE 530 may have a standing instruction to perform an initial handshake with access points, such as the second access point 522, that communicate via a particular second protocol (e.g., 4G). This standing instruction could be based on cell density, network coverage, or a characteristic of the signal used to communicate with the UE 530, such as bandwidth or wavelength. In one example, the UE 530 may have a standing instruction to attempt an initial uplink handshake with the lowest available frequency band in a known area in order to leverage a high wavelength that may minimize attenuation and scattering.

Upon the determination, based on at least one network parameter, that a first uplink handshake between the first transmitter 532 and the first access point 512 would fail if attempted at an initial first maximum uplink power and/or that a second uplink handshake between the second transmitter 534 and the second access point 522 would have (or has) power headroom at an initial second maximum uplink power, the UE 530 may adjust (if determined locally), or be instructed to adjust (if determined remotely, relative to the UE), one or more of the first and second maximum uplink powers. As in other aspects, such an adjustment may be the result of an inverse relationship between the first maximum uplink power and the second maximum uplink power, that is, as the second maximum uplink power is reduced, the first maximum uplink power may be proportionately increased. Once the first maximum uplink power is increased, an uplink handshake may be initially performed. If the uplink handshake is successful between the first transmitter 532 and the first access point 512, it is possible that the first maximum uplink power has power headroom, in which case the UE 530 may transmit the first uplink signal 542 at an uplink power less than the first maximum uplink power.

Figure 6:
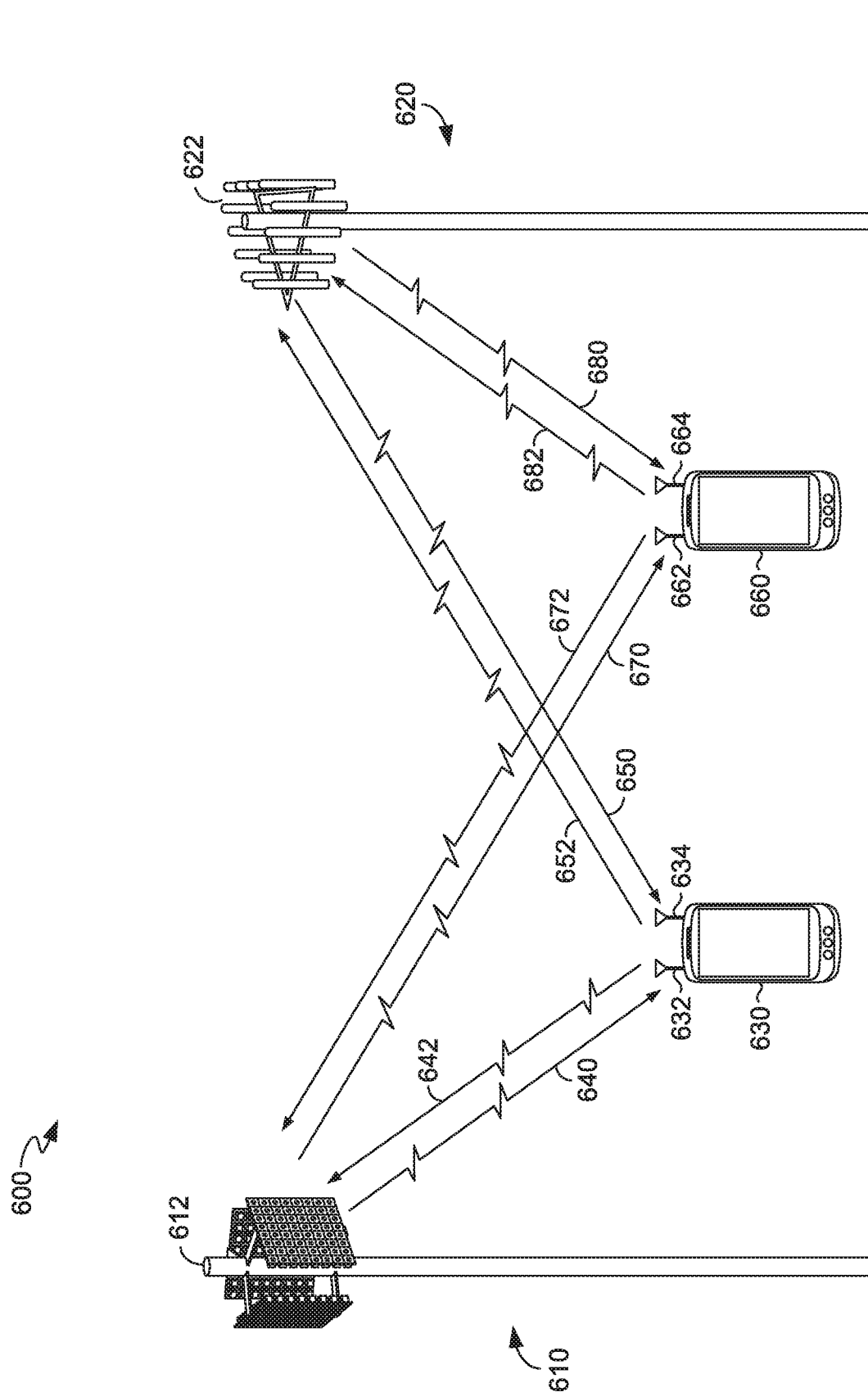
FIG. 6 depicts a representation of a first and second access point wirelessly communicating with a first UE and a second UE, in accordance with aspects herein.

Turning now to FIG. 6, an illustration of a partial network environment 600 is with multiple UEs is depicted in accordance with aspects herein. In aspects, the network environment 600 may incorporate any one or more features of any of the previous portions of this disclosure. In other aspects, the network environment 600 may comprise a first access point 612, disposed at a first base station 610 at a first cell site, and a second access point 622 disposed at a second base station 620 at a second cell site. The first access point 612 may communicate a first wireless downlink signal 640 to a first UE 630 according to a first communication protocol, and the second access point 622 may communicate a second wireless downlink signal 650 to the first UE 630 according to a second communication protocol. The first UE 630 may comprise a first transmitter 632 for communicating a first wireless uplink signal 642 to the first access point 612 according to the first communication protocol and using a first maximum uplink power. The first UE 630 may also comprise a second transmitter 634 for communicating a second wireless uplink signal 652 to the second access point 622 according to the second communication protocol and using a second maximum uplink power.

The first access point 612 may communicate a third wireless downlink signal 670 to a second UE 660 according to the first communication protocol, and the second access point 622 may communicate a fourth wireless downlink signal 680 to the second UE 660 according to the second communication protocol. The second UE 660 may comprise a third transmitter 662 for communicating a third wireless uplink signal 672 to the first access point 612 according to the first communication protocol and using a third maximum uplink power. The second UE 660 may also comprise a fourth transmitter 664 for communicating a fourth wireless uplink signal 682 to the second access point 622 according to the second communication protocol and using a fourth maximum uplink power.

In aspects, the first and third wireless downlink signals have different propagation properties than the second and fourth wireless downlink signals, which may impact network parameters, as defined herein. This difference may, for example, be based on different frequency bands used by each of the first and second access points to communicate according to their respective protocols. In aspects, the first access point may be a gNodeB, configured to communicate via 5G, in the 2.5 GHz band. In aspects, the second access point may be an eNodeB, configured to communicate via 4G in the 850 MHz band. Because of the different wavelengths, it may be said (for example, by applying the Friis transmission equation) that the shorter wavelength of the first and third wireless downlink signals may experience greater free space path loss than the longer wavelength of the second and fourth wireless downlink signals. As a result, even though the distance between the first access point 612 and the second UE 660, and the distance between the second access point 622 and the first UE 630 may be the same, the network parameters experienced by the first UE 630 with respect to the second access point 622 may be different than the network parameters experienced by the second UE 660 with respect to the first access point 612. Accordingly, aspects herein contemplate that network parameters are independently determined for each and every UE to appropriately determine the unique network parameters that may be used as a basis for the dynamic power allocation/modification, disclosed herein.

Figure 7:
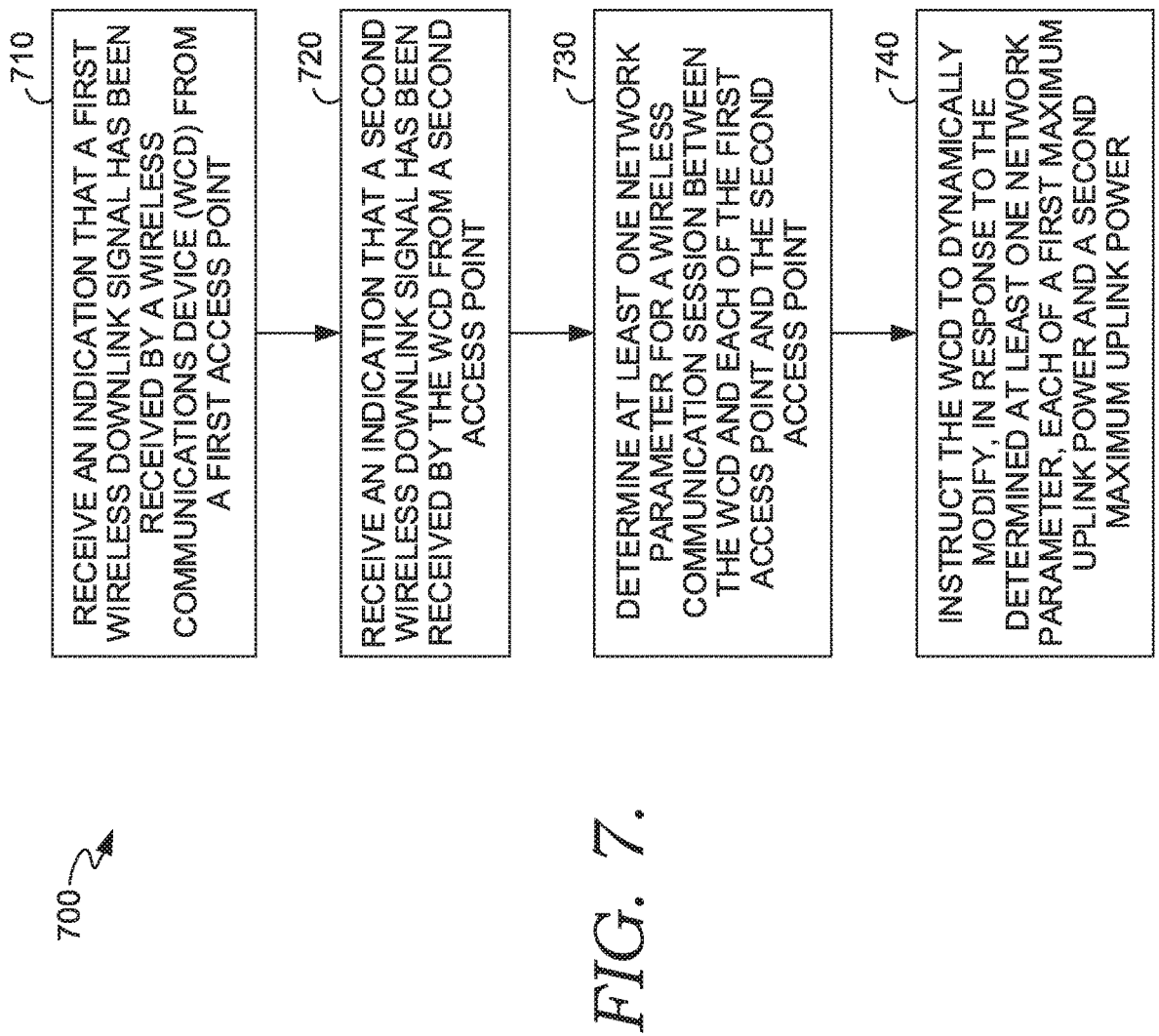
FIG. 7 depicts a flow diagram of an exemplary method for dual connectivity power control, in accordance with aspects herein.

FIG. 7 depicts a flow diagram of an exemplary method 700 for dual connectivity power control, in accordance with aspects of the present disclosure.

Initially at block 710, a UE, one or more of a first access point and a second access point, and/or any other processor such as a network controller, or any other device, engine, or component communicatively coupled to the wireless communication network and capable of determining one or more network parameters receives an indication that a first wireless downlink signal has been received by a UE from a first access point. In aspects, the first wireless downlink signal may be communicated by the first access point according to a first communication protocol (e.g., 4G) and may be located at a first base station.

At block 720, a UE, one or more of a first access point and a second access point, and/or any other processor such as a network controller, or any other device, engine, or component communicatively coupled to the wireless communication network and capable of determining one or more network parameters receives an indication that a second wireless downlink signal has been received by a UE from a second access point. The second wireless signal may be communicated by the second access point according to a second communication protocol (e.g., 5G) and may be located at a second base station, wherein the first base station and the second base station are located at different sites. In other aspects, the first and second access points may be located at the same base station or the different first and second base stations may be co-located or in close proximity at the same site. In some aspects, the first communication protocol may be different than the second communication protocol; in other aspects, the first communication protocol may be the same protocol as the second communication protocol but the first wireless downlink and uplink signals are communicated in different frequency bands/channels than the second wireless downlink and uplink signals.

At block 730, at least one network parameter for a wireless communication session between the UE and each of the first access point and the second access point is determined. In aspects, the one or more network parameters may be based on any combination of the first wireless downlink signal, a first wireless uplink signal, the second wireless downlink signal, and a second wireless uplink signal, wherein the first wireless uplink signal uses the same protocol as the first wireless downlink signal (e.g., 4G), and the second wireless uplink signal uses the same protocol as the second wireless downlink signal (e.g., 5G). Such a network parameter may comprise pathloss, SINR, multipathing, atmospheric ducting, distance between the UE and an access point, height of eye of the UE, line of sight between the UE and an access point, or any other atmospheric, electrical, electromagnetic, or mechanical effect or phenomenon. For example, at block 730, a first network parameter (pathloss) may be determined for a first wireless downlink signal, a second network parameter (pathloss) may be determined for a second wireless downlink signal, and a third network parameter (UE location, relative to each of the first and second access point) may be determined. By determining the one or more network parameters, it can be determined how much power headroom exists for a first wireless uplink signal communicated by a first transmitter of the UE to the first access point, and thus how much power can be dynamically allocated to increase a second maximum uplink power capable of being used by the second transmitter to communicate a second wireless uplink signal to the second access point.

At block 740, the UE may (if determined locally) adjust, or be instructed to adjust (if determined remotely, relative to the UE), each of the first and second maximum uplink powers based on the determination of block 730. In aspects, the dynamic modification of block 740 may comprise lowering the first maximum uplink power wherein the first maximum uplink power exceeds that power required to communicate the first wireless uplink signal to the first access point, and increasing the second maximum uplink power wherein the second maximum uplink power is inadequate to communicate the second wireless uplink signal to the second access point. The dynamic modification of block 740 may, in some aspects, be inversely proportional, that is, if the first maximum uplink power is reduced by 100 mW, the second maximum uplink power may be increased by 100 mW. Non-proportional modifications are also contemplated, such as partial proportionality (reducing the first maximum uplink power by 100 mW and increasing the second maximum uplink power by half (50 mW) of the first maximum uplink power's decrease). Without regard to the modification scheme, the sum dynamic power modification of block 740 is configured such that the sum of the first maximum uplink power and the second maximum uplink power does not exceed the maximum total uplink power. In discussed above, the maximum total uplink power may be set based on any number of technological, safety, or regulatory limit. In aspects, the maximum total uplink power may be 23, 26, 27, 29, of 30 dBm. In other aspects, the maximum total uplink power may be in the range of 20 dBM to 33 dBm.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A wireless communication device (WCD) for dynamically allocating maximum total uplink power comprising:
one or more transmitters configured to transmit a first wireless uplink signal to a first access point and a second wireless uplink signal to a second access point; and
a processor configured to perform operations comprising:
determine a power headroom of the WCD for transmitting the first wireless uplink signal to the first access point; and
reduce a first maximum uplink power used by the WCD to transmit the first wireless uplink signal to the first access point by at least a portion of the power headroom and at least partially proportionately increase a second maximum uplink power from an initial value to a modified value, the second maximum up link power being available to the WCD to transmit the second wireless uplink signal to the second access point, wherein the WCD has failed to establish or maintain an uplink connection with the second access point using the initial value.

2. The WCD of claim 1, wherein the first access point and the second access point are co-located at a common site.

3. The WCD of claim 1, wherein the first access point is located at a first site and the second access point is located at a second site.

4. The WCD of claim 1, wherein determining the power headroom of the WCD for transmitting the first wireless uplink signal to the first access point comprises receiving an indication from the first access point or the second access point.

5. The WCD of claim 1, wherein determining the at least one network parameter for a wireless communication session between the WCD and each of the first access point and the second access point comprises receiving an indication from the first access point or the second access point.

6. The WCD of claim 1, wherein communicates with the first access point using a first protocol and the WCD communicates with the second access point using a second protocol.

7. The WCD of claim 1, wherein a sum of the first maximum uplink power and the second maximum uplink power is 29 dBm.

8. The WCD of claim 1, wherein the first maximum uplink power does not equal the second maximum uplink power.

9. A method for dynamic power allocation in a wireless communications device (WCD), the method comprising:
determining a power headroom of the WCD for transmitting a first wireless uplink signal to the first access point; and
reducing a first maximum uplink power used by the WCD to transmit the first wireless uplink signal to the first access point by at least a portion of the power headroom and at least partially proportionately increase a second maximum up link power from an initial value to a modified value, the second maximum uplink power being available to the WCD to transmit the second wireless uplink signal to the second access point, wherein the WCD has failed to establish or maintain an uplink connection with the second access point using the initial value.

10. A system for dynamically allocating maximum total uplink power in a wireless communication device (WCD), the system comprising:
a first access point configured to transmit a first wireless downlink signal to the WCD;
a second access point configured to transmit a second wireless downlink signal to the WCD; and
a processor configured to perform operations comprising:
determine a power headroom used by a first transmitter of the WCD to transmit a first wireless uplink signal to the first access point; and
instruct the WCD to reduce a first maximum uplink power used by the first transmitter of the WCD to transmit the first wireless uplink signal to the first access point by a proportion of the power headroom and at least partially proportionately increase a second maximum uplink power from an initial value to a modified value, the second maximum uplink power being available to a second transmitter of the WCD to transmit a second wireless uplink signal to the second access point, wherein the WCD has failed to establish or maintain an uplink connection with the second access point using the initial value.

11. The system of claim 10, wherein the first access point and the second access point are co-located at a common site.

12. The system of claim 10, wherein the first access point is located at a first site and the second access point is located at a second site.

13. The system of claim 10, wherein the first access point communicates with the WCD using an eNodeB.

14. The system of claim 10, wherein the first access point communicates with the WCD using a gNodeB.

15. The system of claim 10, wherein the first access point communicates with the WCD using a first protocol and second access point communicates with the WCD using a second protocol.

16. The system of claim 10, wherein each of the first maximum uplink power and the second maximum uplink power is between 15 dBm and 29 dBm.

17. The system of claim 10, wherein the sum of the first maximum uplink power and the second maximum uplink power is 29 dBm.

18. The system of claim 10, wherein the first maximum uplink power does not equal the second maximum uplink power.

* * * * *